(12) United States Patent
Shanmugam et al.

(10) Patent No.: US 9,503,894 B2
(45) Date of Patent: Nov. 22, 2016

(54) SYMBIOTIC BIOMETRIC SECURITY

(71) Applicant: CELLCO PARTNERSHIP, Basking Ridge, NJ (US)

(72) Inventors: Sankar Shanmugam, Dayton, NJ (US); Moorthy Sengottaiyan, Somerset, NJ (US); Sivagnanalingam Sivaganesh, Belle Mead, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 39 days.

(21) Appl. No.: 14/201,341

(22) Filed: Mar. 7, 2014

(65) Prior Publication Data
US 2015/0257004 A1 Sep. 10, 2015

(51) Int. Cl.
*H04W 12/06* (2009.01)
*H04L 29/06* (2006.01)

(52) U.S. Cl.
CPC .......... *H04W 12/06* (2013.01); *H04L 63/0853* (2013.01)

(58) Field of Classification Search
CPC ........ G06F 21/32; G06F 21/31; G06F 21/34; G06F 21/40; H04W 12/08; H04W 12/06; H04W 88/02; H04L 63/0861; H04L 63/102; H04L 63/0815; H04L 63/0823; H04L 63/0853; H04L 63/0892; H04L 9/3231
See application file for complete search history.

(56) References Cited

U.S. PATENT DOCUMENTS

| | | | |
|---|---|---|---|
| 7,606,560 B2 * | 10/2009 | Labrou et al. ............. | 455/411 |
| 8,543,828 B2 * | 9/2013 | Albisu ....................... | 713/184 |
| 2004/0015243 A1 * | 1/2004 | Mercredi et al. ............. | 700/17 |
| 2004/0185842 A1 * | 9/2004 | Spaur ...................... | B60R 25/04 455/420 |
| 2006/0234764 A1 * | 10/2006 | Gamo .................... | G06F 21/629 455/552.1 |
| 2009/0100265 A1 * | 4/2009 | Tadokoro ........... | G07C 9/00087 713/172 |
| 2010/0138667 A1 * | 6/2010 | Adams .................... | G06F 21/32 713/186 |
| 2010/0240415 A1 * | 9/2010 | Kim .................... | G06F 3/03547 455/565 |
| 2012/0324581 A1 * | 12/2012 | Economos, Jr. ...... | H04W 12/08 726/25 |
| 2013/0024914 A1 * | 1/2013 | Ahmed et al. ................. | 726/4 |
| 2013/0042314 A1 * | 2/2013 | Kelley ............................ | 726/9 |
| 2013/0227664 A1 | 8/2013 | McKay | |
| 2013/0244686 A1 * | 9/2013 | Saha ...................... | G06F 1/3206 455/456.1 |
| 2014/0013424 A1 * | 1/2014 | Lv ................................ | 726/19 |
| 2014/0223191 A1 * | 8/2014 | Tadokoro ........... | G07C 9/00087 713/186 |
| 2014/0283012 A1 * | 9/2014 | Eggerton et al. .............. | 726/19 |

* cited by examiner

Primary Examiner — Matthew Sams

(57) ABSTRACT

The method, system and device examples provide for a mobile device biometric authentication that authenticates an application user via a biometric input, and thereby reduce the need to enter complex user credentials into a mobile device to gain access to a mobile application. The examples leverage the biometric recognition operations managed by the operating system of the mobile device to allow a mobile application to authenticate the user as a valid user of the mobile application. In an example, a successfully unlocking of a mobile device via a biometric input from a user is used by the mobile application to perform an authentication operation with assistance from an authentication server to authenticate the user of the mobile device as a valid user of the mobile application. As a result, the mobile application grants access to the mobile application based on the user's biometric input.

20 Claims, 8 Drawing Sheets

300

400

500

SYMBIOTIC BIOMETRIC SECURITY

BACKGROUND

Today, there are many solutions available for user authentication on mobile devices. These solutions vary in the nature of how users are authenticated. Some use password for authentication; others use pattern, biometric or facial recognition.

These solutions also vary in the context of how the users are authenticated. The user authentication occurs either at the device level or at the application level. Device level authentication authenticates whether a user is a valid user of mobile device thereby establishing ownership. Device level authentication generally uses knowledge-based mechanisms like PINs, passwords and visual interfaces. This knowledge-based input might be more time-consuming and exhausting to the user. Application level authentication, on the other hand, authenticates whether a user is a valid user of an application installed on the mobile device.

Alternative approaches to device level user authentication are stroke-based mechanisms using a touch screen. This approach may be regarded as an extension to the knowledge-based authentication with the difference that the user remembers a shape of strokes than a number or a password. The user enters the shape by applying a sequence of strokes rather than using a number or password.

Another alternative authentication method is to use graphical passwords. A graphical password does not consist of digits and letters, but of one or more images (e.g., an automobile, a shoe, a horse, or a parking meter). One approach is to select a correct sequence of presented images or alternatively to locate special points in a presented image. Graphical passwords can be used on mobile devices, but require a certain screen size and resolution, and a sufficient method, such as a cropping function or the like, to select the images or points.

In general, application level authentication requires the user to enter at least a password, if not a user name as well, every time the application is started. This type of authentication presents limitations in terms of usability as well as security. For instance, users often need to enter complex usernames and/or passwords manually on mobile devices that often have a small screen size. In addition, password authentication also presents a security limitation as the application needs to store the password and possibly the user name somewhere on the mobile device for verification.

Biometric authentication is becoming more common on mobile devices for device-level authentication. Current mobile applications, however, do not support biometric technology as a method of application-level authentication. The device-level biometric authentication does not establish whether a user is a valid user of a mobile application installed on the mobile device. For example, if user Annabel uses her fingerprint to gain access to her smartphone, it just proves that Annabel is a registered user of the smartphone, and does not automatically guarantee that Annabel is a valid user of the banking mobile app installed on that smartphone. The banking application instead may still require user input of a user name and/or password.

Hence a need exists for a mobile application-level biometric authentication system and method that uses biometric technology offered on a mobile device in the same manner that a smartphone allows users to unlock their mobile device and establish device ownership or authorized use of the mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION OF EXAMPLES

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to a mobile application biometric authentication processes and systems. The disclosed mobile device application biometric authentication service offers an easy and secure method that not only performs authentication at the device level but also at the application level. A "biometric" as described herein refers to physical information obtained from a person that uniquely distinguishes and identifies one person from another. Examples of a biometric are a person's fingerprint, a sample of a person's voice, a facial image, a retinal image, and the like. A "biometric input" is an input of a biometric into a biometric sensor or input component, such as a microphone, of a device. For example, a biometric input is a fingerprint input to a fingerprint scanner, an image of a person's face or their retina obtained by a camera, or the like. An example provides for pairing a valid user's fingerprint input for logging into a mobile application with mobile device identifier, and based on a valid recognition of the valid user's fingerprint by the mobile device, the valid user is given access to data through the mobile application. A "mobile application" may be any application program instructions that execute on a mobile device. Such an application often provides access to data, stored on the mobile device, stored in a remote database accessible through a data network, or a combination of both. Examples of mobile applications include banking applications, medical records and service applications, investment applications, video service applications (e.g., video streaming services), digital media (e.g., audio and video) stores, and the like. A "data network" is a network through which data is commonly exchanged, such as, for example, a private intranet or the public Internet. The data network may be coupled to a cellular communication network as well as other networks. The data that may be accessed via the mobile application may be personal to the valid user, such as financial data, medical information, identifying information (e.g., Social Security Number), and the like.

Reference now is made in detail to the examples illustrated in the accompanying drawings and discussed below.

Figure 1:
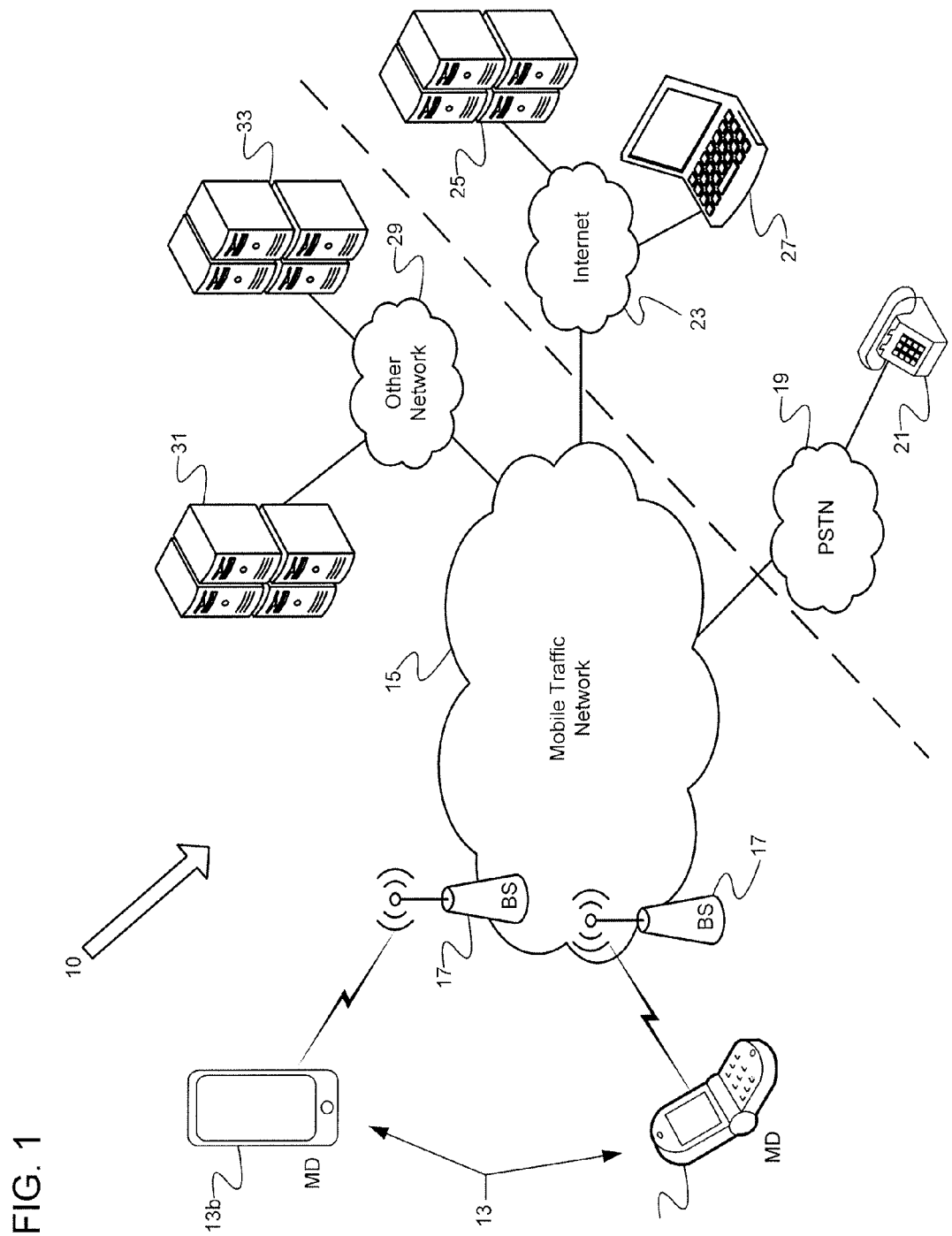
FIG. 1 is a high-level functional block diagram of a system example of networks/devices that provide various communications for mobile devices and support an example of a mobile application biometric authentication service.

FIG. 1 illustrates a system 10 offering a variety of mobile communication services, including communications for biometric authentication of mobile applications for mobile device users. The example shows simply two mobile devices (MDs) 13a and 13b as well as a mobile communication network 15. The devices 13a and 13b are examples of mobile devices that may be used for the mobile application biometric authentication service. However, the network will provide similar communications for many other similar users as well as for mobile devices/users that do not participate in the mobile application biometric authentication service. The network 15 provides mobile wireless communications services to those devices as well as to other mobile devices (not shown), for example, via a number of base stations (BSs) 17. The present examples may be implemented in any of a variety of available mobile networks 15 and/or on any type of mobile device compatible with such a network 15, and the drawing shows only a very simplified example of a few relevant elements of the network 15 for purposes of discussion here. Although referred to here as base stations for convenience networks implemented with some types of wireless technologies refer to such wireless access elements by other terms, such as wireless access points or eNodeB.

The wireless mobile communication network 15 might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, Long Term Evolution (LTE) standard, or other standards used for public mobile wireless communications. The mobile devices 13a and 13b (generally referred to as 13) may are capable of voice telephone communications through the network 15, and for the mobile application biometric authentication services, the exemplary devices 13a and 13b are capable of data communications through the particular type of network 15 (and the users thereof typically will have subscribed to data service through the network).

The network 15 allows users of the mobile devices such as 13a and 13b (and other mobile devices not shown) to initiate and receive telephone calls to each other as well as through the public switched telephone network or "PSTN" 19 and telephone devices 21 connected to the PSTN. The network 15 typically offers a variety of data services via the Internet 23, such as downloads, web browsing, email, etc. By way of example, the drawing shows a laptop PC type user terminal 27 as well as a server 25 connected to the Internet 23; and the data services for the mobile devices 13 via the Internet 23 may be with devices like those shown at 25 and 27 as well as with a variety of other types of devices or systems capable of data communications through various interconnected networks. The mobile devices 13a and 13 of users of the mobile application biometric authentication service also can receive and execute applications written in various programming languages, as discussed in more detail below.

Mobile devices 13 can take the form of portable handsets, smart-phones or personal digital assistants, although they may be implemented in other form factors. Program applications, including an application to assist in, or otherwise use the mobile application biometric authentication service, can be configured to execute on many different types of mobile devices 13. For example, a mobile device application can be written to execute on a binary runtime environment for an iOS mobile device, a BREW-based mobile device, a Windows Mobile based mobile device, Android, Java Mobile, or RIM based mobile device such as a BlackBerry or the like. Some of these types of devices can employ a multi-tasking operating system.

The mobile communication network 10 can be implemented by a number of interconnected networks that are controlled by or cooperate with a network service provider (e.g., a cellular communication carrier). Hence, the overall network 10 may include a number of radio access networks (RANs), as well as regional ground networks interconnecting a number of RANs and a wide area network (WAN) interconnecting the regional ground networks to core network elements. A regional portion of the network 10, such as network 15 serving mobile devices 13, can include one or more RANs and a regional circuit and/or packet switched network and associated signaling network facilities. The operator of the system or network 10 may also operate other connected networks or elements, such as those shown at 29-33 in FIG. 1. The network 10, e.g., through its mobile traffic network(s) 15 provides communications connectivities to various other networks and devices shown generally at in the drawing (outside the dotted line of demarcation of system/network 10). In our simple example, the elements generally shown at include various communication networks (e.g., the public switched telephone network (PSTN) 19 and Internet 23), and devices (e.g., phone 21, terminal device 27 and host or server computer 25) that have access to the overall network 10. The networks may be controlled by, or cooperate with, the cellular communication carrier, but are often operated by other entities.

Physical elements of a RAN operated by one of the mobile service providers or carriers include base stations (BSs) 17. Although not separately shown, such a base station 17 can include a base transceiver system (BTS), which can communicate via an antennae system at the site of base device and over the airlink with one or more of the mobile devices 13, when the mobile devices are within range. Each base station 17 can include a BTS coupled to several antennae mounted on a radio tower within a coverage area often referred to as a "cell." The BTS is the part of the radio network that sends and receives RF signals to/from the mobile devices 13 that are served by the base station 17.

The radio access networks can also include a traffic network represented generally by the cloud at 15, which carries the user communications and data for the mobile devices 13 between the base stations 17 and other elements with or through which the mobile devices communicate. The network can also include other elements that support functionality other than device-to-device media transfer services such as messaging service messages and voice communications. Specific elements of the network 15 for carrying the voice and data traffic and for controlling various aspects of the calls or sessions through the network 15 are omitted here form simplicity. It will be understood that the various network elements can communicate with each other and other aspects of the mobile communications network 10 and other networks (e.g., PSTN 19 and the Internet 23) either directly or indirectly.

The cellular communication carrier will also operate a number of systems that provide ancillary functions in support of the communications services and/or application services provided through the network 10, and those elements communicate with other nodes or elements of the network 10 via one or more private IP type packet data networks 29 (sometimes referred to as an Intranet), i.e., a private networks. Generally, such systems are part of or connected for communication via the private network 29. It should be apparent, however, that systems outside of the private network could serve the same functions as well. Examples of such systems, in this case operated by the network service provider as part of the overall network 10, which communicate through the intranet type network 29, include one or more application servers 31 and a related authentication server 33 for the application service of server 31.

A mobile device 13 communicates over the air with a base station 17 and through the traffic network 15 for various voice and data communications, e.g. through the Internet 23 with a server 25 and/or with application servers 31. If the mobile service carrier offers the mobile application biometric authentication service, the service may be hosted on a carrier operated application server 31, for communication via the networks 15 and 29. Alternatively, the mobile application biometric authentication service may be provided by a separate entity (alone or through agreements with the carrier), in which case, the service may be hosted on an application server such as server 25 connected for communication via the networks 15 and 23. Servers such as 25 and 31 may provide any of a variety of common application or service functions in support of or in addition to an application program running on the mobile device 13. However, for purposes of further discussion, we will focus on functions thereof in support of the mobile application biometric authentication service. For a given service, including the mobile application biometric authentication service, an application program within the mobile device may be considered as a 'client' and the programming at 25, 31 or 33 may be considered as the 'server' application for the particular service.

To insure that the application service offered by server 31 is available to only authorized devices/users, the provider of the application service also deploys an authentication server 33. The authentication server 33 could be a separate physical server as shown, or authentication server 33 could be implemented as another program module running on the same hardware platform as the server application 31. In some examples, when the server application (server 31 in our example) receives a service request from a client application on a mobile device 13, the server application provides appropriate information to the authentication server 33 to allow server application 33 to authenticate the mobile device 13 as outlined herein. Upon successful authentication, the server 33 informs the server application 31, which in turn provides access to the service via data communication through the various communication elements (e.g. 29, 15 and 17) of the network 10. Alternatively, the mobile device 13 may communicate directly with the authentication server 33 to authenticate a user via a biometric input. Similar authentication functions may be provided for examples of the mobile application biometric authentication service(s) offered via the server 25, either by the server 33 if there is an appropriate arrangement between the carrier and the operator of server 24, by a program on the server 25 or via a separate authentication server (not shown) connected to the Internet 23.

For example, a user may wish to access a user account (e.g. a cell phone service account), and may launch a mobile application on a mobile device 13b. In response to the mobile application launch, the mobile application establishes through the mobile device 13b a connection with the application server 31 to access user account information. Before the application server 31 provides the user with access to account information, the application server 31 may require the user to authenticate him/herself as a valid user associated with the user account that the user is attempting to access. The application server 31 may send a request to the authentication server 33 to authenticate the mobile device 13b. Authentication information (e.g., user credentials, such as username and/or password) may be provided by the user through the mobile application on the mobile device 13b either directly to the authentication server 33 or by providing the authentication information to the application server 31 which forwards the authentication information to the authentication server 33. As explained in more detail later, the authentication information may include an authentication key, a device identifier and possibly other data for the server to process to validate user authentication. Alternatively, the mobile application, in response to the launch, may establish a connection directly with the authentication server 33, which then provides a connection to the application server 31. Of course, other methods of authenticating a user may be used. After successful authentication by the authentication server 33, the user is able to access the user account information.

The enhanced mobile application biometric authentication service under consideration here may be delivered to touch screen type mobile devices as well as to non-touch type mobile devices. Hence, our simple example shows the mobile device (MD) 13a as a non-touch type mobile device and shows the mobile device (MD) 13b as a touch screen type mobile device. Implementation of the mobile application biometric authentication service will involve at least some execution of programming in the mobile devices as well as implementation of user input/output functions and data communications through the network 15, from the mobile devices 13a and 13b.

Figure 2:
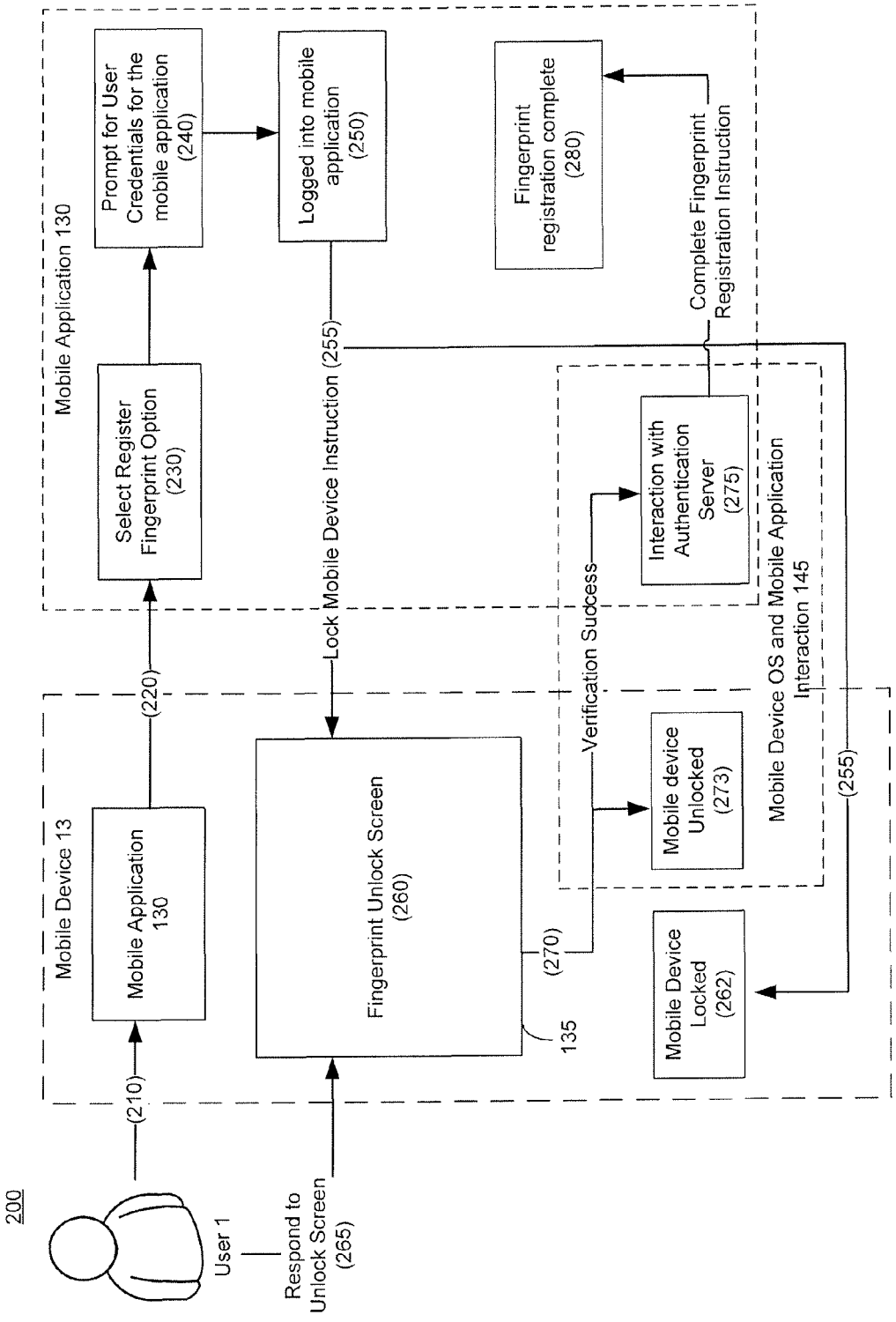
FIG. 2 is a high-level block diagram illustrating an example of a registration process for registering a user with the mobile application biometric authentication service.

FIG. 2 is a high-level block diagram illustrating an example of a registration process for registering a user with the mobile application biometric authentication service.

Prerequisites for using mobile application biometric authentication service as described by way of the following examples are that a mobile device is enabled to accept biometrics for unlocking the mobile device, and that the user should have already registered her biometric, such as a fingerprint, voice print, or the like, with the device to have established device-level authentication with the respective mobile device. In other words, the user is able to use the biometric to access (e.g., unlock) the user's mobile device. The described examples of the mobile application biometric authentication service use the mobile device's operating system biometric device unlock feature as a method to assure that the user is the valid user of the mobile application. In other words, the mobile application leverages the mobile device's biometric recognition capabilities as a first level of authentication of the user. In response to the mobile device's operating system successfully recognizing the inputted user biometric (e.g., fingerprint) and unlocking the mobile device, the mobile application performs additional authentication steps.

Prior to being able to authenticate a valid user through the use of the mobile application biometric authentication service, the valid user is prompted to complete a registration process. This is a one-time process and typically only needs to be carried out when a user initially chooses to use the biometric option provided by the mobile application. A similar registration may be required for each application that allows the biometric authentication. In order to be able to be authenticated, a user registers their biometric identifier with an authentication server associated with the mobile application. For example, if the mobile application is a banking application, the bank, or a bank-related entity (e.g., a vendor hired by a bank to manage/administer the banking application), will provide an authentication server, such as authentication server 33 in FIG. 1, to authenticate user credentials provided by the mobile device. The authentication server, for example, authenticates the user of the mobile device as a valid user, and, as a result, the user is permitted to access data via the mobile application. The user biometric may be one or more of a fingerprint, voice password, retinal scan, facial recognition of the user that is to be using the mobile application. The biometric identifier may be an identifier associated with the user's biometric, or associated with the user's use of a biometric for application access.

For ease of explanation and illustration, only the fingerprint biometric will be discussed and illustrated in the figures, but the other biometrics (e.g., voice or face recognition) may be similarly used in the registration process and for any subsequent authentication process.

In general, the registration process associates the fingerprint of the valid user with the mobile application by using a particular mobile device identifier. In other words, during the registration process, the fact that a user is able to log into their mobile device having an identifier, such an mobile device number (MDN) of 777-777-7777, using their fingerprint is used by the authentication server to associate or register the user with the Wells Fargo® mobile banking application as a valid user. The registration process for registering a user's biometric as a substitute for inputting user credentials when logging into a mobile application will now be described in more detail with reference to FIG. 2.

As background, User 1 may, for example, have a complex combination of user name and password for gaining access to a mobile application that they use frequently. User 1 may want to avoid the cumbersome process of using the complex combination of user name and password to log into the mobile application by instead using the herein disclosed examples of a mobile application biometric authentication service to log into the mobile application 130. In order for User 1 to take advantage of the mobile application biometric authentication service, User 1 first registers her biometric with the mobile application 130. With the mobile device 13 unlocked and prepared to accept user inputs, the mobile device 13 may present on a mobile device display 135 a number of mobile applications that are available on the mobile device 13. User 1 via a user input to the mobile device 13 selects (Step 210) mobile application 130 installed on the mobile device 13. In response to the selection, mobile application 130 may launch a welcome screen on the display 135 of the mobile device 13 (Step 220), and may present on the mobile device display 135 a menu with a number of biometric login preference options from which User 1 may select. Different biometric login options may be presented on the mobile device display 135. For example, a general biometric login option may be presented on the display 135. Upon selection of the general biometric login option, the mobile application 130 may prompt the User 1 to select a specific type of preferred biometric login setting, such as a fingerprint recognition login, a facial recognition login, a voice recognition login, a retinal recognition login or the like. Alternatively, the presented biometric login option may be for only the specific type of biometric available on the mobile device. For example, if the mobile device 13 supports both voice and fingerprint login, then both may be presented. In yet another alternative, only fingerprint login may be offered.

In the example of FIG. 2, the user selects the "Register Fingerprint Option" as a preferred user biometric login preference at Step 230. In response to selection of the register fingerprint recognition option, the mobile application 130 prompts User 1 to provide text-based user credentials, such as a user username and a password or similar identifying alphanumeric characters or information, to log into the mobile application (Step 240). The user credentials may have been provided by User 1 when initially installing the mobile application 130 on the mobile device 13, or when establishing a user account associated with the mobile application 130. For example, if mobile application 130 is a banking application, the authentication server for the bank may require each user to establish user credentials when associating the mobile application 130 with the user's bank account. A similar scenario may apply to other types of user accounts, such as user accounts with streaming video services, on-line mobile network account services, on-line application or media stores, e-commerce services, and the like. In response to the prompt, User 1 inputs her user credentials to log into the application in order to have access data provided via the mobile application 130.

The mobile application 130 causes the user credentials provided in response to the prompt to be transmitted by the mobile device 13 to an authentication server (shown in other drawings) associated with the mobile application 130. Based on the inputted user credentials, the authentication server authenticates the user as a valid user. As a result, User 1 is successfully authenticated based on the inputted username/password and is logged into the mobile application (Step 250). Upon being logged into the mobile application and in response to the User 1 selection of the register fingerprint option selected at 230, the mobile application forwards an instruction (Step 255) to the mobile device 13 operating system (OS) to lock the mobile device (step 262) and to present a fingerprint unlock screen (Step 260) on the mobile device screen 135. Examples of mobile device operating systems (OS) include Android, Apple iOS (I-Phone or iPad devices), Windows Mobile, RIM BlackBerry operating system, or the like, and will be discussed in more detail below. The fingerprint unlock screen, for example, is a prompt to use a fingerprint to unlock the mobile device. The mobile device 13 is now locked, and is presented on the mobile device display 135.

In response to the presented fingerprint unlock screen, User 1 responds by placing a finger on a fingerprint sensor (not shown, but explained in more detail below) for scanning of the finger's fingerprint (Step 265). At this point in the registration process 200, the mobile device application 130 may set a time limit for the User 1 to respond to the fingerprint unlock screen. For example, the mobile application 130 may set the time limit for inputting a fingerprint at 25 seconds, 30 seconds or the like. If the User 1 has not inputted a fingerprint by the end of the set time limit, the mobile application may close, generate a prompt asking if the user wishes to continue with the fingerprint (i.e., biometric) registration process 200, or the like.

If the User 1 enters the fingerprint within the set time limit, the mobile device OS performs a fingerprint recognition process. If the fingerprint verification fails, the mobile device will stay in the 'Locked' state. Re-tries may be available, e.g., if supported by the particular OS. Conversely, if the fingerprint is successfully verified by the mobile device OS as being associated with User 1, the mobile device OS, at 270, causes the mobile device to be unlocked (273) and provides a signal indicating that the verification of the User 1 fingerprint was successful to the mobile application 130.

At this time, it may be helpful to discuss the interaction between the mobile device 13 OS and the mobile application 130. The mobile device 13 stores, and runs, an OS through which specific applications may interact when executing on the mobile device. The mobile device OS provides an application programming interface (API) for developers to access and use the device biometric (e.g., fingerprint) unlock functionality. Through the OS API, the mobile application 130 is able to request, such as via instruction 255 generated at 250, that the OS lock the mobile device and present the fingerprint unlock screen, and also obtain an indication that the OS has verified the inputted fingerprint as belonging to User 1, such as 270. As a result of signals provided through the OS API, the mobile application 130 is able to perform the preceding functions as well as the following functions.

For example, the mobile device OS via the API may simply provide to the mobile application 130 a notification that the mobile device was unlocked by the fingerprint input, which results in the removal of the fingerprint unlock screen from the mobile device display 135. Alternatively, some other signal may be generated in response to a successful fingerprint verification by the mobile device OS, such as a Boolean value or integer value regarding user action and result. For example, a True value or integer 1 value indicates a successful authentication result. While the signal indicating successful verification allows User 1 to access the mobile application, at this stage of our example, the fingerprint registration process 200 has not yet been completed.

In response to receiving the indication that the fingerprint was successfully verified by the mobile device OS via the OS API, the mobile application 130 retrieves an identifier for transmission to the authentication server of the mobile application. The identifier may be an identifier associated with the mobile device 13. For example, the mobile device 13 identifier may include at least one of a mobile device serial number (SN), a mobile device number (MDN), integrated circuit card identifier (ICCID) and an International Mobile Device Equipment Identity (IMEI) retrieved from the mobile device memory (not shown) and/or either a universal integrated circuit card (IUCC) or a subscriber identity module (SIM) (not shown). It is noted that the mobile device 13 identifier is not limited to the SN, MDN, ICCID, or the like, and includes all other possible identifiers of the mobile device 13. Such as device-specific identifier may be combined with other identifying information such as a user name or mobile service account identifier (if different from the device identifier).

The mobile device application 130 exchanges the identifier information with the authentication server at step 275. The authentication server, such as authentication server 310 of FIG. 3, performs a registration process that will be described in more detail with reference to FIG. 3. The authentication server 310, for example, returns an authentication key that may be used when User 1 wants to access the mobile application 130 using the biometric login. In this example, the returned authentication key is only used to authenticate a user when the biometric mobile application login is performed. In another example, the authentication key may be used for regular complex password based authentication that is also provided by the mobile device. In another alternative, the authentication key may also be used with voiceprint authentication, if the OS supports the voiceprint authentication feature. The authentication key is stored to a memory in the mobile device, such as a secure element memory, like a subscriber identity module (SIM) card or other type of universal integrated circuit card (UICC). In addition, the mobile device user preference settings are set to indicate that User 1 can use the fingerprint unlock screen to gain access to the mobile application data. The user is now registered to access the mobile device application using the fingerprint unlock screen, and the fingerprint registration is complete (280).

As shown in FIG. 2, the example login registration utilizes the mobile device's 130 biometric login capabilities, in this example, the fingerprint login, as part of the authentication process. Another part of the authentication process is the generation of the authentication key by an authentication server associated with the mobile application 130.

Figure 3:
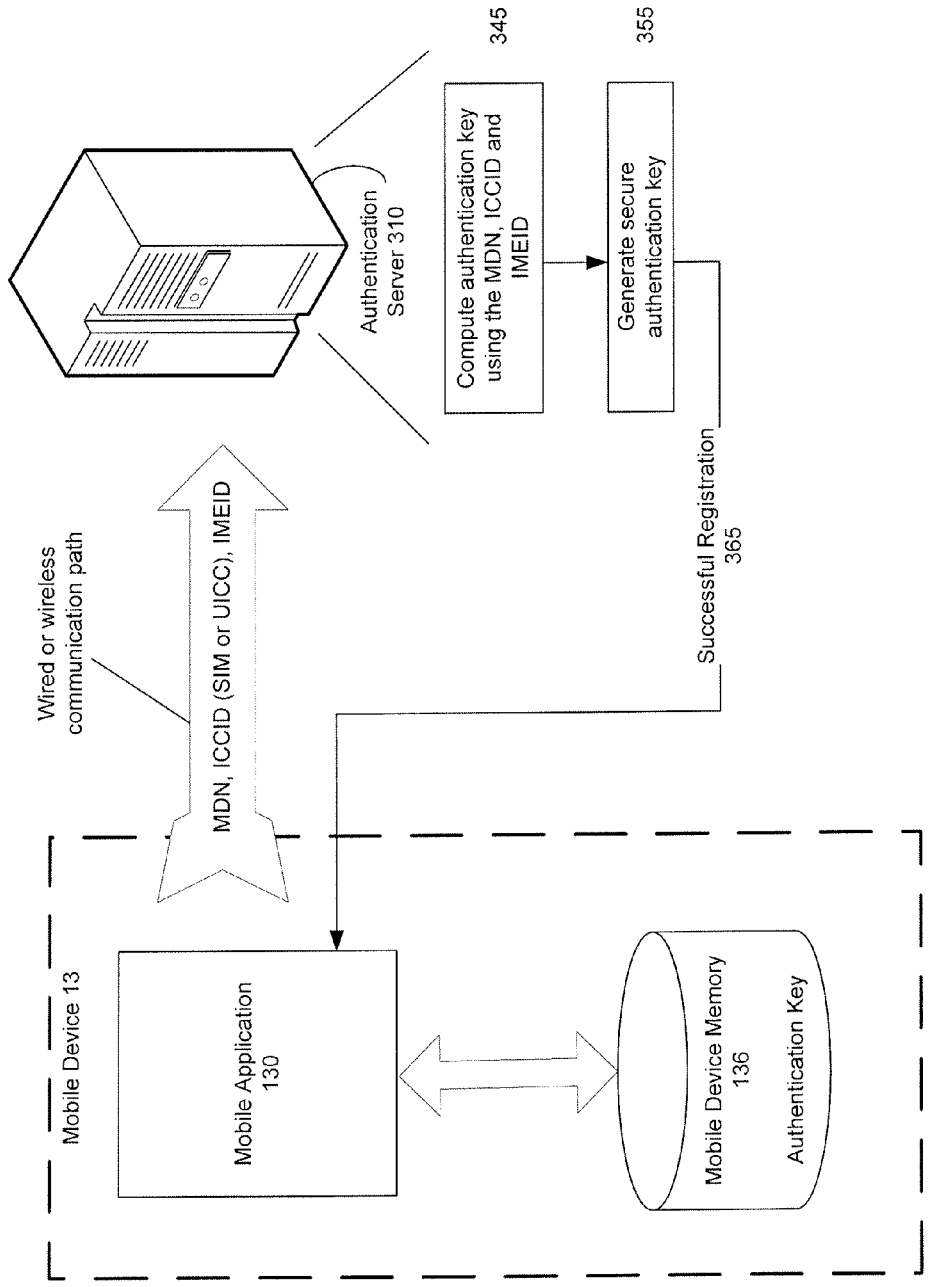
FIG. 3 is a high-level functional block diagram illustrating an example of generating an authentication key to complete the registration process example of FIG. 2.

FIG. 3 is a high-level functional block diagram illustrating an example of generating an authentication key to complete the registration process example of FIG. 2. The mobile device 13 includes the mobile application 130 and a mobile device memory 136.

As mentioned with respect to FIG. 2, at step 275, the mobile application 130 interacts with authentication server 310 to begin the authentication key generation process 300. In response to a successful verification of the biometric (e.g., fingerprint) input by the User 1, the mobile application 130 obtains an identifier associated with the mobile device 130 from a memory location accessible by a processor of the mobile device 130. The identifier may be one or more of the MDN, ICCID and IMEID associated with the mobile device 130. An additional level of security is obtained by using more than one of the identifiers. For example, users often provide the mobile device 13 MDN as part of the user contact information, so the MDN may be an identifier that is easily obtained by a potential bad actor. However, the ICCID and IMEID of the mobile device 13 are less easily obtained, and, as a result, when used to generate the authentication key provide an additional level of security. Of course, the mobile application 130 may send other identifiers and/or combinations of identifiers, such as a secure code that is provided by short message service (SMS) after the user logs in using the fingerprint, or an identifier that is stored on the mobile device 13 at the time the mobile application 130 is installed on the mobile device 13, or the like, to the authentication server 310. For example, the mobile application 130 may be configured to cause an SMS message containing an authentication key (e.g., passcode, mobile device identifier, authentication information as described herein, or the like) to be sent from the mobile device 13 to the authentication server 310 for use with authenticating the user. Alternatively, at time of registration (which is described in more detail with respect to FIG. 3) of the user with the authentication server 310, the authentication server 310 may generate an SMS message containing a code that is sent to the user to input during the registration process.

The identifiers are sent over a wired or wireless communication path to the authentication server 310 associated with the mobile application 130. The wired communication path may be, for example, when the mobile device 13 is coupled to a computer, such as a personal computer (PC) or a laptop computer (e.g. 27 of FIG. 1), and the computer via a web browser is interacting with the authentication server 310 through a website associated with the mobile application 130. Alternatively, the wireless communication path may be via a cellular connection through for example network 15 of FIG. 1 or via a Wi-Fi or other wireless access system to a network, such as the Internet 23.

When the authentication server 310 receives the identifiers, the authentication server 310 computes an authentication key, for example, using the MDN, ICCID and the IMEID by applying a function to values representing the MDN, ICCID and the IMEID identifiers (345). An example of the function used to generate the authentication key may be a hash function. The hash function using as inputs the MDN value, the ICCID value and the IMEID value generates a hash key.

After computing the authentication key (i.e., hash key), the authentication key may be secured by encrypting the authentication key (355), and the secure authentication key is sent to the mobile application 130 as an indication of a successful registration (365). In other examples, the computed authentication key is left unsecured, in which case, step 355 may be omitted.

In response to receiving the secure authentication key, the mobile application 130 saves the secure authentication key on the mobile device in a secure application memory location (after decryption if encrypted by optional step 355). The secure application memory location is a memory location that only the mobile application 130 is permitted to access. For example, the secure application memory location may be a portion of memory in a secure element of the mobile device 130, for example in a memory incorporated in the SIM or other type of UICC of the mobile device 13. The secure element and the UICC/SIM memory examples will be discussed in more detail with reference to FIGS. 6 and 7.

After storing the authentication key, the fingerprint authentication is now successfully registered with the mobile application 130, and step 280 of FIG. 2, as described above, can be performed.

Upon registration of the User 1 fingerprint with the mobile application, any subsequent launches of the mobile application 130 on the mobile device 13 will allow User 1 to use their fingerprint to log into the mobile application 130. A subsequent user interaction with the mobile application 130 is illustrated in FIG. 4.

Figure 4:
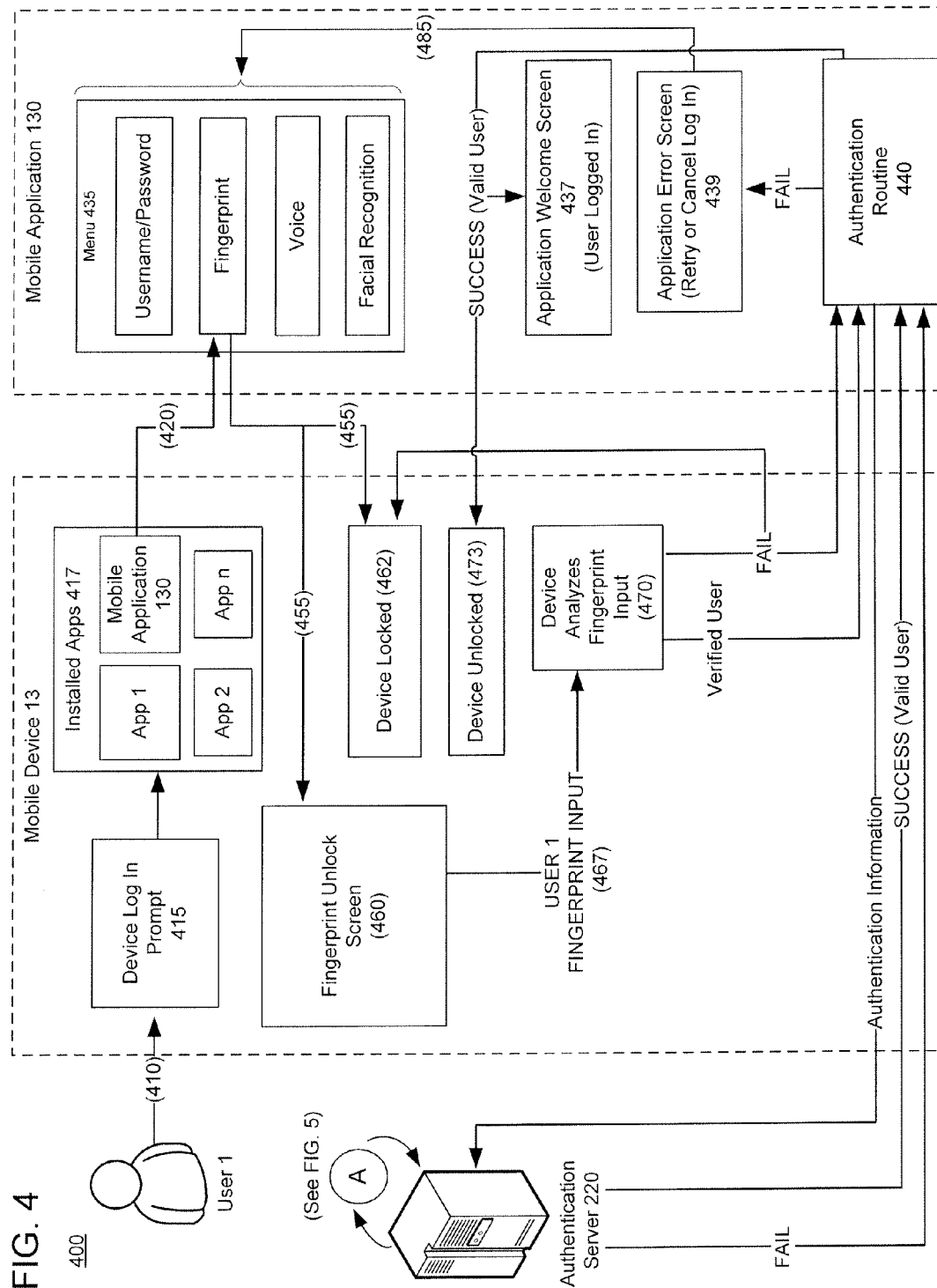
FIG. 4 is a high-level block diagram illustrating an example of a biometric login process subsequent to the registration process example in FIG. 2.

The subsequent login process 400 of FIG. 4 includes the mobile device 13, the mobile application 130 executing on the mobile device 13, and the authentication server 310. In step 410, User 1 logs into the mobile device via the device login prompt 415. This login involves a device-level biometric authentication controlled by execution of the device OS. After successfully logging into the mobile device, User 1 may be presented on a display of the mobile device 13 with a menu or screen containing a display of the installed applications 417, such as App 1, App 2, and mobile application 130 up to App n, where n is an integer. In response to a selection of mobile app 130 from the displayed menu or screen, the mobile application 130 launches (420). After launch, the mobile application 130 presents a menu 435 that prompts the user to select a login option. The options may be limited based on user preferences that are stored in a memory of the mobile device 130. For example, in response to receiving the input selecting the mobile application 130, the mobile application confirms that a login preference setting for authenticating a user by the mobile device application includes a biometric login preference setting. Based on the user biometric login preference settings, some of the presented options may be, for example, username/password, fingerprint, voice, and facial recognition.

Alternatively, the menu may be limited to username/password and fingerprint or the menu may be skipped, once registered for fingerprint authentication (i.e. fingerprint login to the mobile device application). If offered, the username/password option may allow the user an alternate access, e.g., if the user perceives a problem with the biometric authentication. In another alternative, in response to the selection of the mobile application 130 from the display of installed applications 417, user preference settings in the mobile device 13 may cause the presentation of the menu 435 to be bypassed, and the mobile device OS or mobile application 130 may generate instruction 455 simply based on the user selection of mobile application.

Returning to the illustrated example, in response to the User 1 selection of the fingerprint login option, the mobile application 130 interacts with the mobile device 13 OS via an API (as described with reference to FIG. 2, element 145) by requesting or instructing (at 455) the mobile device 13 OS to lock the mobile device (462) and generate the fingerprint unlock prompt screen (460).

In response to the presentation of the fingerprint unlock screen 460, User 1 applies, at 467, a fingerprint to a fingerprint sensor (not shown) of the mobile device 13 to provide a fingerprint input to unlock the mobile device 13. The mobile device 13 OS at 470 analyzes the fingerprint input and either successfully verifies or fails to verify User 1's fingerprint input in a manner similar to the operations discussed earlier regarding step 273 of process 200.

When performing the fingerprint input analysis, the mobile device 13 OS may, for example, perform a comparison of information derived from the inputted fingerprint information to previously stored fingerprint information. Of course, other techniques may be used to verify the inputted fingerprint as that of a verified user of the mobile device 13. For the examples presented herein, the method used for analyzing the inputted fingerprint by the mobile device OS may be any suitable analysis method that is able to provide some indication of the results (e.g. a device unlock signal, a fingerprint recognition event signal, or the like) of the fingerprint analysis to the mobile application 130.

The fingerprint input analysis at 470 returns, depending upon the analysis results, either a verification failure signal (i.e., FAIL) or a verified user (i.e. Verified User) signal to an authentication routine 440 of the mobile application 130. The authentication routine 440 may be software that is part of a software development kit provided either by the mobile device 13 original equipment manufacturer (OEM) or by the mobile device OS provider.

In response to receiving the verification failure signal from the mobile device 13 OS, the mobile device 13 OS causes the mobile device 13 to remain locked (462). In addition, the mobile device OS may cause a fingerprint unlock screen (460) to be presented on a display of the mobile device 13 prompting the User 1 to retry the fingerprint login process.

Alternatively, if the mobile device 13 OS at 470 successfully verifies the User 1 fingerprint input as belonging to an authorized user, the mobile device 13 OS unlocks the device (473) in response to a verified user signal, and forwards the verified user signal to the mobile application 130 authentication routine 440. In response to receiving the verified (i.e., authorized) user signal, the authentication routine 440 forwards authentication information (described in more detail below with respect to FIG. 5) to the authentication server 310. Optionally or in addition, while the mobile application 130 is forwarding the authentication information to the authentication server 130 and waiting for a response from the authentication server 130, the mobile device 13 OS may permit the mobile application 130 to present a screen indicating that the mobile application 130 is in the process of authenticating the user as a valid user of the mobile application 130.

The authentication server 310 may be associated with the mobile application 130. For example, if the mobile application 130 is a digital media streaming application that delivers steaming videos from a content server, the authentication server 310 may be associated with the content server and authenticate, based on the forwarded authenticating information, the mobile device 13 user as a subscriber and/or the mobile device as a device authorized to receive content from the content server. Alternatively, the authentication server 310 may be associated with a network service provider that provides network services (e.g., cellular and/or data services) to the mobile device 13, or may be associated with a third-party vendor that provides the authentication service.

In response to receiving the authentication information, the authentication server 310 performs an authentication process (e.g. represented by A, which is described in more detail below with respect to FIG. 5). If the authentication server 310 successfully authenticates User 1 as a valid user, the authentication server 310 returns a signal (e.g., Success (Valid User)) to the mobile device 13 and the authentication routine 440 of mobile application 130 indicating that the authentication process (A) performed by the authentication server 310 was successful. Based on the successful authentication signal received from the application server 310, the mobile application 130 via the authentication routine 440 causes the presentation of an application welcome screen (437), in which case, User 1 is logged into the mobile application 130 and able to access data associated with the mobile application 130.

Alternatively, there may be at least two general areas in which an authentication failure may occur: fingerprint authentication and authentication failure by the server. The fingerprint authentication is an OS function. The mobile device 13 OS has access to the information (either in a device memory or via access to a remote server) for authenticating an inputted fingerprint as an authorized user of the mobile device 13. If the mobile device 13 OS fails to authenticate the user, the OS at 470, may generate a fingerprint analysis failure (FAIL) signal that is provided to the device locked function (462) and the OS may cause the presentation of a fingerprint authentication failure screen (not shown). In which case, the user may make another attempt to authenticate themselves via a fingerprint input as an authorized user of the mobile device 13. However, this is different from being a valid user of the mobile application 130. Optionally or in addition to maintaining the mobile device 13 in a locked state, the mobile device 13 OS may provide the failure (FAIL) signal to the mobile application 130. In response to receiving the fingerprint failure signal, the mobile application 130 may generate the application error screen 439.

The other authentication failure, an authentication server 130 failure (i.e., a failure in which the authentication server 130 cannot authenticate the user based on the provided authentication information), may be caused by a number of factors, such as corruption of one of the identifiers, corruption of the stored authentication hash function result, errors in or interference with the transmitted signal, and the like. For example, one of the identifiers sent by the mobile device 13 may be corrupted and the hash function performed by the authentication server 310 using the identifier does not return a result matching the stored hash function result, but the user fingerprint is an authentic user fingerprint. The authentication server failure alone will not prevent an authorized user of mobile device 13 from unlocking the mobile device, but will prevent the user from accessing the mobile application 130. if the authentication server 310 fails to authenticate the User 1 based on the analysis of the authentication information provided by the mobile device application 13, the authentication server 310 returns an authentication failure (e.g., FAIL) signal to the authentication routine 440 of the mobile application 130 and the mobile device 13. As a result, in response to receiving the authentication failure signal (e.g., FAIL) from the authentication server 310 indicating that the authentication information is incorrect, the mobile application 130 via the authentication routine 440 causes the presentation of an application error screen 439 and may cancel the fingerprint login attempt or generate a prompt for User 1 to retry the fingerprint scan. For example, at 485, in response to the authentication failure signal, the mobile application 130 may cause the display of menu 435 with a prompt for selection of an access method (e.g., voice, username/password, fingerprint, and the like) to the mobile application 130.

After a pre-determined number (e.g., 3-5) of unsuccessful attempts to authenticate User 1 by authentication routine 440, the mobile application 130 may present an error screen and then proceed to close, for example. Alternatively, the mobile application 130, depending upon the type of application (e.g., a media streaming service versus a banking application), may allow a user more or less attempts at successfully authenticating themselves. For example, the banking application may only allow a user to attempt 1 or 2 times to authenticate before requiring a user to input an identification number or log on via a website, while the media streaming application may allow 4 or 5 attempts to logging in before locking a user out of the biometric authentication. In another alternative, the mobile application 130, depending on the type of service being provided, may allow an extended amount of time to input the fingerprint for scanning. For example, an application directed to handicapped persons or elderly persons may allocate more time for the user to input a fingerprint for scanning, while a gaming application may provide the standard (e.g., 25 seconds) amount of time for inputting a fingerprint for scanning. In addition, the mobile application 130 causes a notification of the unsuccessful attempts to authenticate to be sent to a notification destination of the valid user of mobile application. For example, the number of unsuccessful attempt notifications sent (e.g. after each unsuccessful attempt or after a maximum number of allowed attempts) may be set by the user in a user preferences of the mobile application 130. Even though User 1 was unsuccessful in this authentication attempt, User 1 may be determined to be a valid user after a subsequent attempt. For example, upon the second attempt, User 1 may be determined to be the valid user. The mobile application 130 may allow the mobile device 13 to be unlocked (by which ever methods are available via the user preference settings), and function as normal until a maximum number of allowed attempts are made. The maximum number may be set by the mobile application 130 developer or by the user via a user preferences setting for the mobile application 130 or mobile device 13. After failing to authenticate within the maximum number of allowed attempts, the system may fall back to another form of authentication such as a user ID and password authentication method.

As an alternative to the authentication routine 440 of the mobile device application 130 sending an authentication failure signal to the mobile device 13 OS, the mobile device application 130 may not send any signal to the mobile device 13 OS in which case, the mobile device 13 OS simply maintains the locked state of the device.

The authentication process (A) performed by the authentication server 310 will now be described in more detail with reference to FIG. 5. FIG. 5 illustrates a high-level functional block diagram illustrating an example of a mobile application user authentication via a biometric login process example of FIG. 4. The system 500 of FIG. 5 includes mobile device 13 and authentication server 310. The mobile device 13 includes mobile application 130, mobile device secure memory 536, mobile device memory 537 and secure element (UICC/SIM/SE) 539. The mobile application 130 executes on a processor (described in more detail with respect to FIGS. 6 and 7) of the mobile device 13.

To summarize from the above discussion, the mobile device 13 OS, in response to verifying the fingerprint input as belonging to a verified user at 470, returns via an API, a verified user signal to the authentication routine 440 of the mobile application 130. And, in response to receiving the verified user signal, the authentication routine 440 forwards authentication information to the authentication server 310. Recall that the authentication information includes an authentication key, and an identifier of the mobile device 13. The identifier of the mobile device 13 may be one or more of the MDN, the ICCID and the IMEID of the mobile device 13. Note that, in some examples, the forwarded biometric authentication information may be different from password authentication information (i.e., authentication information passed to the authentication server 310 when the user accesses the mobile application 130 using a password or passcode), while, in other examples, the authentication information is the same regardless of whether the authentication method was via biometric input or password input.

Prior to forwarding the authentication information to the authentication server 310, the mobile application 130 performs a number of functions. For example, the mobile application 130 accesses memory locations associated with the mobile application 130 to obtain an identifier to be included in the authentication information message sent to the authentication server 310.

Figure 5:
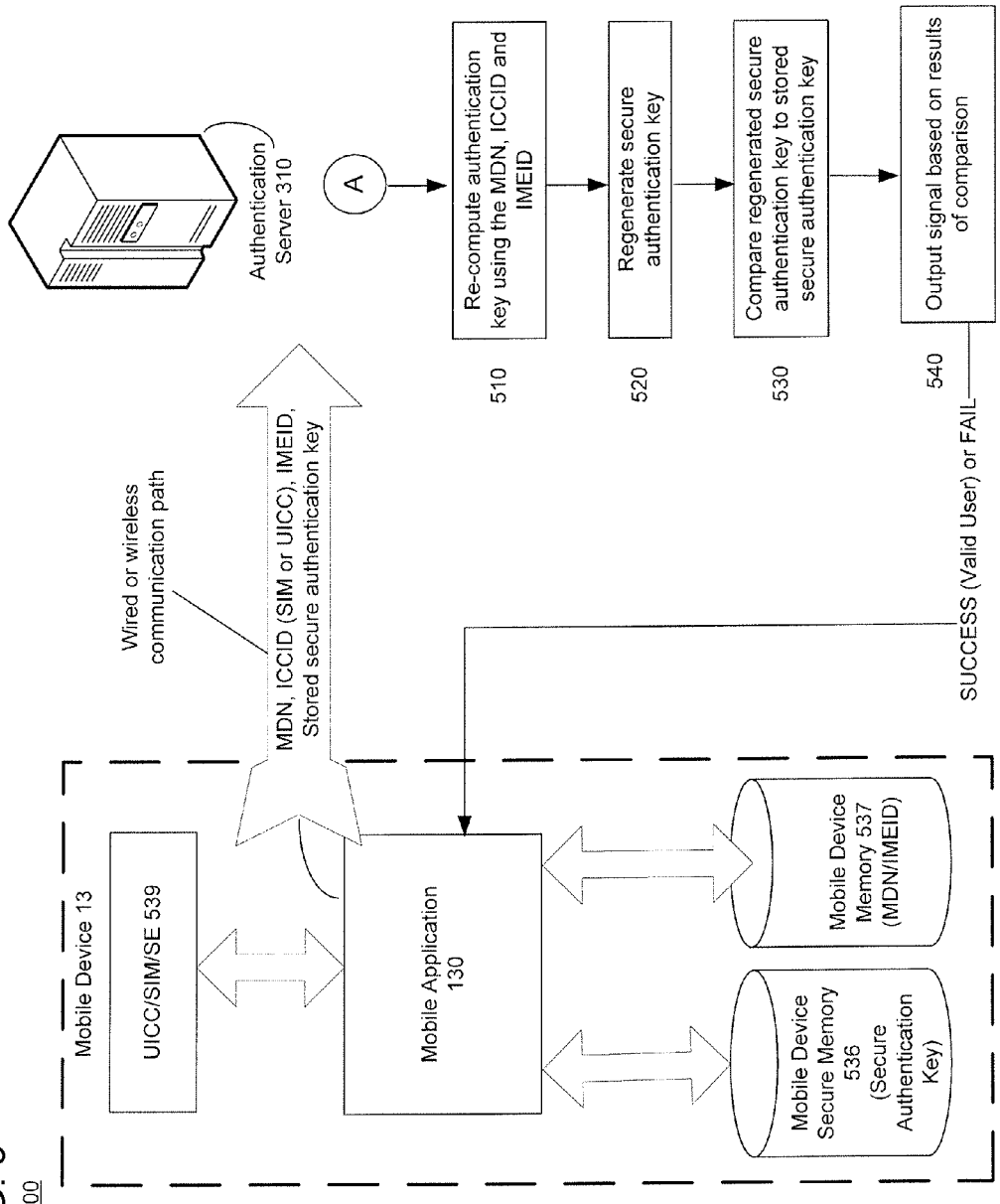
FIG. 5 illustrates a high-level functional block diagram illustrating an example of a mobile application user authentication via a biometric login process example of FIG. 4.

Now with reference to FIG. 5, the identifier, for example, may be one or more of the MDN, ICCID and IMEID associated with the mobile device 130. An additional level of security is obtained by using more than one of the identifiers. Of course, other identifiers and/or combinations of identifiers, such as a secure code that is provided by short message service (SMS) after the user logs in using the fingerprint, or an identifier that is stored on the mobile device 13 at the time mobile application 13 is installed on the mobile device, or the like, may be used.

The mobile application 130 may obtain the identifier associated with mobile device 13 for the authentication information message from a memory accessible by the mobile device 13 processor. For example, the mobile application 130 may obtain from a mobile device memory 537 an MDN and/or IMEID associated with the mobile device 13. Similarly, or in addition, the mobile device 13 processor may access the mobile device secure element (SE) of the mobile device 13 to retrieve an ICCID associated with the mobile device 13. In addition to the other retrieved identifier(s), the mobile application 130 also retrieves the secure authentication key stored from the registration process of FIG. 2.

The authentication information (e.g., identifiers and secure authentication key) are sent by the mobile application 130 over a wired or wireless communication path to the authentication server 310 associated with the mobile application 130. The wired communication path may be, for example, when the mobile device 13 is coupled to a computer, such as a personal computer (PC) or a laptop computer (e.g. 27 of FIG. 1), and the computer via a web browser is interacting with the authentication server 310 through a website associated with the mobile application 130. Alternatively, the wireless communication path may be via a cellular connection through, for example, network 15 of FIG. 1, or via a Wi-Fi or other wireless access system to a network, such as the Internet 23.

When the authentication server 310 receives the identifiers and secure authentication key, the authentication server 310 performs the authentication process (A) referred to in the discussion of FIG. 4. For example, at step 510, the authentication server 310 computes, or re-computes, an authentication key using the MDN, ICCID and the IMEID by applying a function to values representing the MDN, ICCID and the IMEID identifiers. An example of the function used to generate the authentication key may be a hash function. The hash function using as inputs the MDN value, the ICCID value and the IMEID value generates a hash key.

After re-computing the authentication key (i.e., hash key) from the received identifiers, the authentication server 310, for example, re-generates a secure authentication key (520) from the provided MDN, ICCID and IMEID values. The re-computed authentication key may be made secure, for example, by encrypting the authentication key or by other processing that may simply add bits to the re-computed authentication key to provide a regenerated secure authentication key. In other examples, the re-computed authentication key is left unsecured, in which case, step 520 may be omitted.

The authentication server 310, at 530, compares the regenerated secure authentication key to the stored secure authentication key provided by the mobile application 130 as part of the authentication information the device transmitted after successful device unlock based on the user fingerprint verification.

The authentication server 310 outputs a signal based on the results of the comparison (540). For example, if the comparison made by the authentication server 310 cannot authenticate User 1 as a valid user, the authentication server 310 authentication process (A), returns a FAIL signal to the mobile application 130. Conversely, if the comparison yields a match result, the authentication process (A) returns a SUCCESS (Valid User) signal to the mobile application 130.

As mentioned prior to the discussion of FIG. 2 various biometric inputs may be used instead of the described fingerprint input, to provide the described examples of biometric mobile application-level authentication. For example, the fingerprint unlock screen (260 of FIG. 2 and 460 of FIG. 4) may be replaced with a voice unlock screen or a facial recognition unlock screen. Similarly, the input of a voice passcode, facial image, graphical image, retinal scan or other biometric may be substituted for the fingerprint input as discussed above. Regardless of the biometric used, the mobile device 13 OS verifies the authenticity of the inputted biometric to unlock the mobile device; and, the described examples use an indication, for example, via an API, that the biometric has been verified as belonging to a verified user of the mobile device 13 to unlock application access. When User 1 has application access, User 1 may be able to access information provided by an application server, such as application server 31, associated with the mobile application 130.

Of course, more than one mobile application may perform the same application-level biometric authentication. For example, User 1 may have a banking application and a media streaming application on her mobile device 13 and may access both applications, if so configured, via the previously explained application-level biometric authentication. Alternatively or in addition, a certain mobile application may allow the successful application-level biometric authentication result for a different application to be used as a substitute for the certain mobile application authentication result. For example, the banking application of Bank RP and the media streaming application may have a partnership based on the user's use of Bank RP's credit card to pay for the streaming media content. As a result, a user may perform the application-level biometric authentication for the Bank RP banking application and the successful authentication result may not only be used by the banking application to permit access, but also by the media streaming application. The successful authentication result may be stored in the memory of the mobile device for a period of time, such as an hour, 1-3 minutes or the like.

Alternatively, the receipt of the successful authentication may cause the launch of a number of related applications that if launched singularly would require separate application-level authentication. For example, an investing application that supports application-level biometric authentication may need access to the user's banking application, a user's secure spreadsheet as well as a separate on-line investment research tool that is not part of the investing application. The successful application-level biometric application authentication for the investing application may cause each of these service applications to also launch and substitute the investing application's successful authentication for their own authentication information. Of course, the other applications would need to be configured to accept the investing application's successful authentication result as their own authentication result and a user would have to approve such a feature through preference settings via one of the related applications and/or via the investing application.

In another example, multiple users, such as a husband/wife, parent/child, roommates and the like, may use a single mobile device 13; however, each user may have an individual profile on the mobile device 13. Alternatively or in addition, a single mobile device user may have multiple profiles, such as a personal profile and business profile. For example, User 1 may have a mobile device that presents either a personal profile or a business profile that are both accessible via a biometric unlock function. Each profile, personal and business, may, for example, have an application configured to allow application-level biometric authentication as described herein. User 1 may use a different biometric input to the mobile device biometric unlock screen to indicate which profile the mobile device is to use at start up. For example, User 1 may use a voice print to open her business profile, and use a fingerprint to open her personal profile. Or, User 1 may use a left-hand index fingerprint to open her business profile, and use a right-hand ring-finger fingerprint to open her personal profile. In yet another example, User 1 may use multiple different fingers (e.g., right-hand thumb and right-hand index finger) for authenticating herself with the authentication server for the mobile application According to the presently described examples, each mobile application that allows application-level biometric authentication to generate an authentication key usable for only that particular mobile application in that specific profile. Similarly, while multiple user's may be able to unlock a mobile device using a biometric input via a biometric input unlock screen, when the biometric input unlock screen is generated in response to the launch of a mobile application, only a user that has registered with the mobile application may access the application. This security setting by an exchange of data between the application and the mobile device OS.

The discussion of FIGS. 2-5 referred frequently to the functions performed by elements of a mobile device 13. It may be useful to consider the functional elements/aspects of two exemplary mobile devices 13a and 13b, at a high-level.

Figure 6:
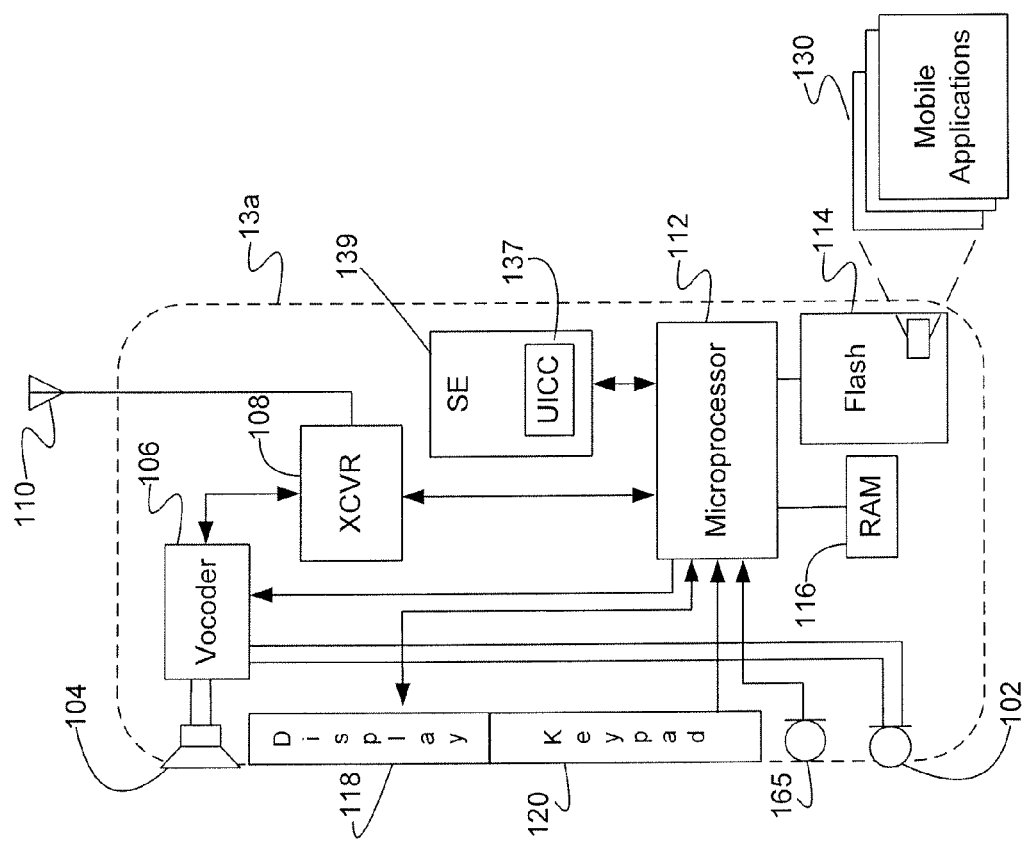
FIG. 6 illustrates a high-level functional block diagram of an exemplary non-touch type mobile device as may utilize the mobile application biometric authentication service through a network/system like that shown in FIG. 1.

For purposes of such a discussion, FIG. 6 provides a block diagram illustration of an exemplary non-touch type mobile device 13a. Although the mobile device 13a may be a smartphone or may be incorporated into another device, such as a personal digital assistant (PDA) or the like, for discussion purposes, the illustration shows the mobile device 13a is in the form of a handset. The handset embodiment of the mobile device 13a functions as a normal digital wireless telephone device. For that function, the device 13a includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications. If voice print is used for the biometric authentication, the microphone 102 and vocoder 106 may also provide the path for audio input for such authentication.

For digital wireless communications, the handset 13a also includes at least one digital transceiver (XCVR) 108. Today, the handset 13a would be configured for digital wireless communications using one or more of the common network technology types. The concepts discussed here encompass embodiments of the mobile device 13a utilizing any digital transceivers that conform to current or future developed digital wireless communication standards. The mobile device 13a may also be capable of analog operation via a legacy network technology.

The transceiver 108 provides two-way wireless communication of information, such as vocoded speech samples and/or digital information for data communications (including for authentication), in accordance with the technology of the network 15. The transceiver 108 also sends and receives a variety of signaling messages in support of the various voice and data services provided via the mobile device 13a and the communication network. Each transceiver 108 connects through RF send and receive amplifiers (not separately shown) to an antenna 110. The transceiver may also support various types of mobile messaging services, such as short message service (SMS), enhanced messaging service (EMS) and/or multimedia messaging service (MMS).

The mobile device 13a includes a display 118 for displaying messages, menus or the like, call related information dialed by the user, calling party numbers, etc., including the described fingerprint unlock screen 260 or 460, the display associated with the register fingerprint option 230, the input user credentials prompt 240, device login prompt 415, installed application menu 417, menu 435, application welcome screen 437 and application error screen 39 for the mobile application biometric authentication service. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications including communications/interactions related to biometric authentication. Of course other user interface elements may be used, such as a trackball, as in some types of PDAs or smart phones.

In addition to normal telephone and data communication related input/output (including message input and message display functions), the user interface elements also may be used for display of menus and other information to the user and user input of selections, including any needed during user selection of a menu option. For example, if used as a selection device, the user interface elements allow a user to select the mobile application from installed apps menu 417 and to select the fingerprint login option from menu 435.

A microprocessor 112 serves as a programmable controller for the mobile device 13a, in that it controls all operations of the mobile device 13a in accord with programming that it executes, for all normal operations, and for operations involved in the mobile application biometric authentication service under consideration here. In a present example, the mobile device 13a includes flash type program memory 114, for storage of various "software" or "firmware" program routines such as device OS including a device-level biometric unlocking routine and verification data (e.g., data related to the recorded voice print or fingerprint scan) for use by the unlocking routine, a boot routine, device driver software, an operating system, call processing software and vocoder control software, and various applications or routines, such as those supporting application-level biometric authentication, client browser software and short message service software. The memory 114 also stores mobile configuration settings, such as the MDN, the IMEID and/or mobile identification number (MIN), etc. The mobile device 13a may also include a non-volatile random access memory (RAM) 116 for a working data processing memory. Of course, other storage devices or configurations may be added to or substituted for those in the example. The memories 114, 116 also store various data, such as telephone numbers and server addresses, downloaded data such as multimedia content, and various data input by the user. Programming stored in the flash type program memory 114, sometimes referred to as "firmware," is loaded into and executed by the microprocessor 112.

As outlined above, the mobile device 13a includes a processor, and programming, such as mobile application(s) 130, stored in the flash memory 114 configures the processor so that the mobile device is capable of performing various desired functions, including in this case the functions involved in the technique for providing mobile application biometric authentication.

The mobile device includes one or more elements for biometric input devices. Although other biometric input devices may be included (e.g., camera) or other device elements (e.g., microphones) be used, the example of FIG. 6 includes a fingerprint sensor 165. The fingerprint sensor 165 is configured to scan a fingerprint when a user moves or places a finger in proximity to the sensor and provide the result to the microprocessor 112. Other biometric inputs such as a voice input may be input into the microphone 102, which is encoded via vocoder 106 and provided to the microprocessor 112. For example, the fingerprint sensor 165 may be used to input a fingerprint when the user is presented with the fingerprint unlock screen 260 or 460, as described above.

The mobile device 13 also includes secure data storage. Although a part of memory 114 may be designated and secured for this purpose, the example utilizes a secure element (SE) 139 that, in one example, is separate chip that includes a secure processor, a tamperproof storage and a memory, and is configured to communicate with applications executing on the processor 112. The secure memory of the SE 139 may contains applications that run inside the secure processor and may provide secure storage for data used by various applications such as mobile application 130, or secure authentication keys (e.g., hash keys) and secure identifiers, such as the ICCID, of the mobile device 13a.

For example, the SE 139 secure memory may include various user account information, such as account number, user identification, a personal identification number (PIN), or the like for user verification and possibly account balance and/or transaction record information. In addition, the SE 139 secure memory may store data for various mobile applications, such as banking, investment, corporate and media streaming applications that require a higher level of security due to the nature of the data that may be exposed due to unauthorized access. The SE 139 may be used to decode credentials of devices. In various examples, the secure element may be part a UICC 137 or a separate secure element like a secure digital (SD) memory card used for storing and accessing applications and data, such as secure authentication keys, such as a hash key provided by an authentication server, in a secure manner. The UICC 137 may be a SIM card.

The logic implemented by the processor 112 of the mobile device 13a configures the processor 112 to control various functions as implemented by the mobile device 13a. The logic for a processor 112 may be implemented in a variety of ways, but in our example, the processor logic is implemented by programming for execution by the processor 112. Regular operations of the device are controlled by operation of the processor 112. Security functions are controlled by operation of the processor of the SE 139, in this example. Implementation of many device functions that rely on security, including the mobile application biometric authentication, therefore for involves interaction between the processor 112 and the processor of the SE 139, e.g., to request and obtain the secure authentication key from storage in the SE 139.

Figure 7:
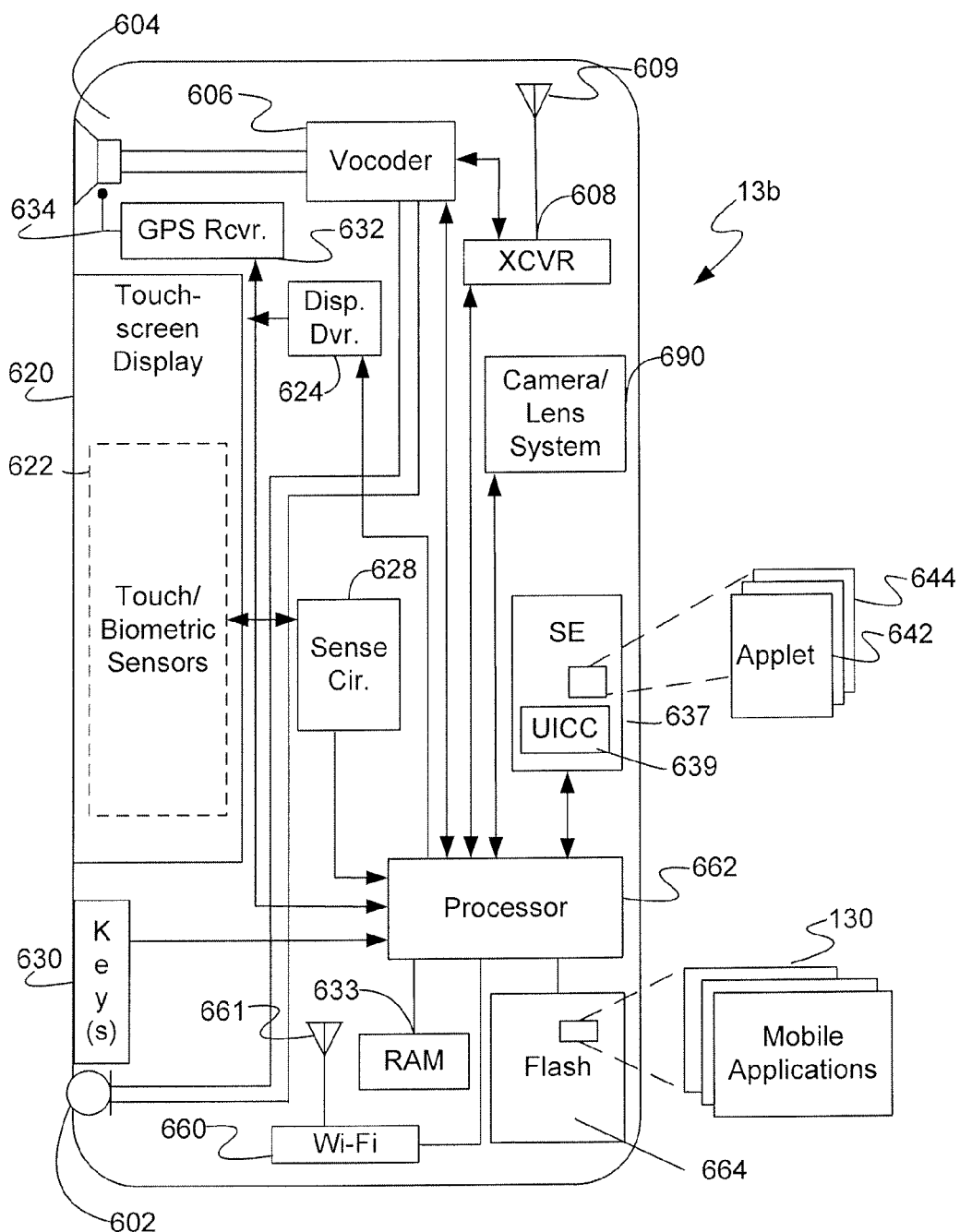
FIG. 7 illustrates a high-level functional block diagram of an exemplary touch screen type mobile device as may utilize the mobile application biometric authentication service through a network/system like that shown in FIG. 1.

For purposes of such a discussion, FIG. 7 provides a block diagram illustration of an exemplary touch screen type mobile device 13b having a touch screen display for displaying content and receiving user input as (or as part of) the user interface. The example in FIG. 6 represents a smartphone. Although the examples discussed thus far utilize data communications, a typical phone-type device, such as the smart phone example 13b, also supports voice communications. Hence, in the example shown in FIG. 7, the mobile device 13b includes a microphone 602 for audio signal input and a speaker 604 for audio signal output. The microphone 602 and speaker 604 are communicatively coupled to a voice or audio encoder/decoder (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some biometric inputs for authentication communications. Increasingly, tablets and other types of mobile devices include similar elements to support audio and visual communication.

Also, as shown in FIG. 7, the mobile device 13*b* includes at least one digital transceiver (XCVR) 608, for digital wireless communications via a wide area wireless mobile communication network, although the mobile device 13*b* may include additional digital or analog transceivers (not shown). The transceiver 608 conforms to one or more of the various digital wireless communication standards utilized by modern mobile networks. Examples of such transceivers include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information supporting communication in one or both directions of digitized audio signals, still image and/or video signals, web page information for display as well as web related inputs, and various types of mobile message communications to/from the mobile device 13*b*.

Several of these types of communications through the transceiver 608 and a network, as discussed later, will relate to provisioning of the SE 637 by a remote server. On-line transaction related communications involving information obtained from the NFC enabled device 63, for example, often utilize Internet Protocol (IP) packet data transport utilizing the digital wireless transceiver (XCVR) 608 and over the air communications to and from base devices of the serving mobile network. Such communications may include specific account related data and security information from the mobile device 13.

In one example, the transceiver 608 also sends and receives a variety of signaling messages in support of various voice and data services provided by a network of a wireless service provider, to a user of mobile device 13 via the mobile communication network. Transceiver 608 connects through radio frequency (RF) send-and-receive amplifiers (not separately shown) to an antenna 609. Many modern mobile devices also support wireless local area network communications over Wi-Fi, instead of or in addition to data communications using the wide area mobile communication network. Hence, in the example of FIG. 6, for packet data communications, the exemplary mobile device 13*b* may also include a Wi-Fi transceiver 660 and associated antenna 661. The transceiver 660, for example, may provide two-way data transport for wireless communication with a wireless access point in a residence or enterprise that the user frequents or with any available hotspot offered in a public venue. Although communicating through a different network or networks, the transceiver 660 supports various types of data communications similar to the packet data communications supported via the mobile network transceiver 608, including communications related to the link application, link companion applet, and/or media player application functions.

The mobile device 13*b* further includes a processor 662, which serves as a programmable controller for mobile device 13 by configuring mobile device 13*b* to perform various operations, for example, in accordance with instructions or programming executable by processor 662. For example, such operations may include various general operations of the mobile device 13*b* as well as operations related to receiving biometric inputs and presenting biometric inputs on the use of mobile application biometric authentication as described herein. A flash memory 664 is used to store, for example, programming (e.g. computer applications) or instructions and various "software" or "firmware" program routines, such as device OS including a device-level biometric unlocking routine and verification data (e.g., data related to the recorded voice print or fingerprint scan) for use by the unlocking routine, a boot routine, device driver software, an operating system, call processing software and vocoder control software, and various applications or routines, such as those supporting application-level biometric authentication, client browser software and short message service software for execution by the processor 662. For example, the described mobile application(s) 130 may be stored in the flash memory 664 and may be executed by the processor 662. The memory 114 also stores mobile configuration settings, such as the MDN, IMEID Flash memory 664 may also be used to store mobile configuration settings for different mobile applications or services executable at mobile device 13*b* (using processor 112). Mobile device 13*b* may also include a non-volatile random access memory (RAM) 116 for a working data processing memory. Depending on the type of device, the mobile device 13*b* stores and runs, an OS through which specific applications may be run on the device. Examples of OS include Android, Apple iOS (e.g., iPhone or iPad devices), Windows Mobile, RIM BlackBerry operating system, or the like. The respective OS provide APIs that are accessible to programming executed by the processor 662.

Of course, other storage devices or configurations may be added to or substituted for those in the example. Such other storage devices may be implemented using any type of storage medium having computer or processor readable instructions or programming stored therein and may include, for example, any or all of the tangible memory of the computers, processors or the like, or associated modules. The instructions or programming may be used to implement the mobile application and the processes for providing the mobile application biometric authentication service, as described herein. Program aspects of the technology may be thought of as "products" or "articles of manufacture" typically in the form of executable code or process instructions and/or associated data that is stored on or embodied in a type of machine or processor readable medium.

A mobile device 13*b* may include a variety of different types of user interface elements. For discussion purposes, in the smart phone example shown in FIG. 6, the user interface elements of mobile device 13*b* include a touch screen display 620 (also referred to herein as "touch screen 620" or "display 620"). For output purposes, the touch screen 620 includes a display screen, such as a liquid crystal display (LCD) or the like. For input purposes, touch screen display 620 includes a plurality of touch sensors 622. Other interface elements may include a keypad including one or more keys 630. For example, the keypad may be implemented in hardware as a T9 or QWERTY keyboard of mobile device 13b and keys 630 may correspond to the physical keys of such a keyboard. Alternatively, keys 630 (and keyboard) of mobile device 13 may be implemented as "soft keys" of a virtual keyboard graphically represented in an appropriate arrangement via touch screen display 620. The soft keys presented on the touch screen display 620 may allow the user of mobile device 13b to invoke the same user interface functions as with the physical hardware keys. In some implementations, the microphone 602 and speaker 604 may be used as additional user interface elements, for audio input and output, including with respect to some functions related to the transaction processing and communication, as described herein. The different user interface elements may be used to navigate through the link application and/or media player application to select content for presentation, purchase content and to perform functions related to the licensed content.

For output, touch screen display 620 is used to present information (e.g., text, video, graphics or other visible digital media content) to the user of mobile device 13b. Processor 662 controls visible display output on the LCD or other display element of the touch screen display 620 via a display driver 624, to present the various visible outputs to the device user.

In general, touch screen display 620 and touch sensors 622 (and one or more keys 630, if included) are used to provide the textual and graphical user interface for the mobile device 13b. In an example, touch screen display 620 provides viewable content to the user at mobile device 13b. Touch screen display 620 also enables the user to interact directly with the viewable content provided in the content display area, typically by touching the surface of the screen with a finger or an implement such as a stylus.

As shown in FIG. 7, the mobile device 13b also includes a sense circuit 628 coupled to touch/biometric sensors 622 for detecting the occurrence and relative location/position of each touch with respect to a content display area of touch screen display 620. The touch/biometric sensor 622 may be configured to scan a fingerprint placed on the touchscreen display. The touch/biometric sensor 622 may, for example, comprise a camera or some other imaging device. In this example, the sense circuit 628 may be configured to obtain fingerprint information (e.g., location of ridges and valleys, and the like) from the scan of the fingerprint. In turn, the sense circuit 628 provides the obtained fingerprint information to processor 662, which performs according to instructions from the mobile device 13b operating system a fingerprint recognition algorithm using the provided fingerprint information.

In addition, the sense circuit 628 is configured to provide processor 662 with touch-position information based on user input received via touch sensors 622 (e.g. a user interface element). In some implementations, processor 662 is configured to correlate the touch position information to specific content being displayed within the content display area on touch screen display 620. The touch-position information captured by sense circuit 628 and provided to processor 662 may include, but is not limited to, coordinates identifying the location of each detected touch with respect to the display area of touch screen display 620 and a timestamp corresponding to each detected touch position.

Similar biometric recognition can be executed using voice inputs via microphone 602 and received from vocoder 606. For example, camera/lens system 690 may be used to provide images of objects for graphical recognition techniques as well as provide facial and retinal images for facial and retinal recognition to the processor 662.

The user interface capabilities of the mobile device 13 provide output to and receive input from the user of the mobile device 13b, for any of the various functions, operations or applications of the device. For example, programming (discussed more later) that configures the mobile device 13b to obtain and act on information presented on the touchscreen display 620 related to obtaining and presenting licensed content.

There is a variety of ways that a mobile device 13 may be configured to obtain information with respect to current location of the device. In our example, the mobile device 13 includes a global positioning satellite (GPS) receiver 632 and associated antenna 634.

In order to run secure applications such as the link companion applet, access to content, routing to an URL site, such as a content server or license server, and the like, there is a Secure Element (SE) 637. In one example, the SE 637 is separate chip that includes a secure processor, a tamper-proof storage and a memory, and is configured to communicate with applications executing on the processor 662. The memory of the SE 637 contains applications (e.g., applets) that run inside the secure processor and provide mobile application-level biometric authentication keys, such as a hash key computed by the authentication server 310, stored in the memory to a mobile application, such as mobile application 130, or mobile device OS that has requested authentication of a user as a valid user of the mobile application 130.

The SE 637 may include various account information, such as account number, user identification, a personal identification number (PIN), or the like for user verification and possibly account balance and/or transaction record information. The SE 637 may be used to decode credentials of devices. In various examples, the secure element may be part a UICC or a separate secure element like a secure digital (SD) memory card used for storing and accessing applications and data, such as mobile device application-level biometric authentication keys, in a secure manner.

The logic implemented by the processor 662 of the mobile device 13 configures the processor 662 to control various functions as implemented by the mobile device 13. The logic for a processor may be implemented in a variety of ways, but in our example, the processor logic is implemented by programming for execution by the processor 662. Regular operations of the device are controlled by operation of the processor 662. Security functions are controlled by operation of the processor of the SE 637, in this example. Implementation of many device functions that rely on security, including the mobile application biometric authentication, therefore for involves interaction between the processor 662 and the processor of the SE 637, e.g., to request and obtain the secure authentication key from storage in the SE 637.

As shown by the above discussion, functions relating to the mobile application biometric authentication service, via a graphical user interface of a mobile device may be implemented on computers connected for data communication via the components of a packet data network, operating as an authentication server as shown in FIGS. 3 and 5. Although special purpose devices may be used, such devices also may be implemented using one or more hardware platforms intended to represent a general class of data processing device commonly used to run "server" programming so as to implement the authentication functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g. files used for the mobile application biometric authentication service. The software code is executable by the general-purpose computer that functions as the authentication server. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for a mobile application biometric authentication service, in essentially the manner performed in the implementations discussed and illustrated herein.

Figure 8:
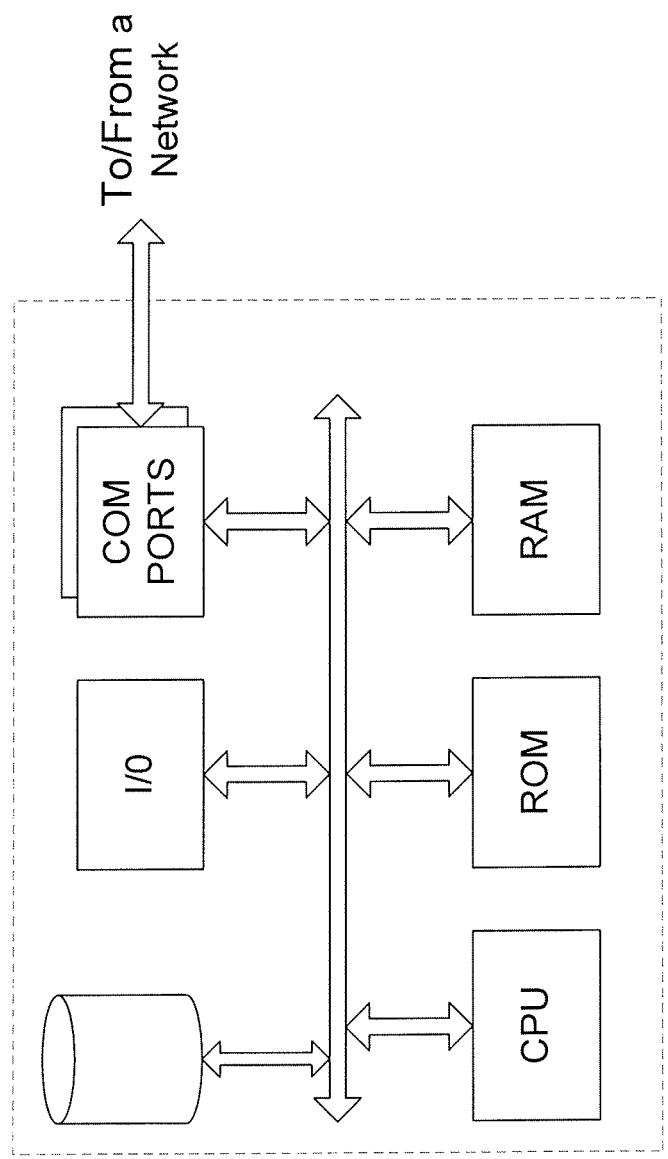
FIG. 8 is a simplified functional block diagram of a computer that may be configured as a host or server, for example, to function as the authentication server in the system of FIGS. 2 and 4.

FIG. 8 illustrates a network or host computer platform, as may typically be used to implement a server. It is believed that the general structure and general operation of such equipment as shown in FIG. 8 should be self-explanatory from the high-level illustrations.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load. For example, the server may have access to one or more mass storage devices for storing user data and the various executable programs, such as registration and authentication programs discussed with reference to and illustrated in FIGS. 3 and 5, respectively. Other aspects of the mobile application biometric authentication for application access may be implemented by an OS and/or applications or other programming for execution by processors of mobile devices like the devices of FIGS. 6 and 7.

Hence, aspects of the methods of mobile application biometric authentication service outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the entity providing the mobile application that is has access to data maintained by a server associated with the entity and/or loading programming over the network into mobile devices. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the mobile application biometric authentication service, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Thus, the mobile application does not itself verify the biometric input; instead the mobile application requests that the OS take measures to verify the biometric input and receives only an indication locally from the OS that the fingerprint has been verified. The mobile application then passes on non-biometric based authentication information through the network to a server associated with the application to provide service to the mobile device. This permits the mobile application to take advantage of the biometric authentication functionality of the OS rather than having to have biometric authentication functionality built in.

The described examples can also be used as a remote authentication device for non-biometric enabled devices. In yet another example, a mobile device equipped with a fingerprint scanner (or other biometric input mechanism (e.g., retinal scanner, voice print recognizer, or the like) may be configured to allow a user attempting to access an application on a device other than the mobile device (i.e., a laptop, desktop, or kiosk) to authenticate themselves as a valid user via an example of the mobile application 130. In the example, a user, such as User 1, is attempting to log into a computer application via a web page presented on a computer (e.g., laptop, tablet, personal computer, workstation, kiosk or the like) that is not equipped with a biometric input device. In response to a prompt (e.g., the website welcome page) from the computer application presented on a display device of the computer, User 1 enters a mobile device identifier, such as the Mobile Directory Number (MDN), into a user interface for the application. The mobile device identifier is that of a mobile device equipped with a fingerprint scanner. In response, the application generates a login request. The login request is sent to a remote server, such as authentication server 310, for authentication.

Upon receipt of the login request from the computer application, the remote server performs a validation routine based on the MDN. In response to a successful validation of the MDN, the remote server, using the MDN, may push a message to a mobile device having the MDN. The message may indicate to the mobile device that it has been selected for fingerprint login based on the MDN in the login request sent into the application or website. In response to the message, a mobile application, such as mobile application 130, may launch on the mobile device to facilitate the input of the fingerprint data. The mobile application on the mobile device causes the mobile device to lock, and present the user with a fingerprint unlock screen.

In response, User 1 scans his finger. In response to a successful fingerprint verification of User 1 as an authorized user, a request is sent back to the remote server requesting that remote server allow User 1 to log into the application on device non-fingerprint enabled. If the fingerprint verification fails, the mobile device may react in the manner described above with respect to FIG. 4, or may simply cancel the remote log in attempt.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   providing, by a mobile device and for presentation, a prompt for a user to unlock the mobile device using a biometric input,
      the mobile device being in a locked state prior to providing the prompt;
   verifying, by the mobile device, a received biometric input as a biometric associated with an authorized user of the mobile device;
   unlocking, by the mobile device and based on verifying the received biometric input, the mobile device;
   providing, by the mobile device, a first menu including a prompt for the user to select a fingerprint login preference setting as a biometric login preference setting for logging into a mobile device application for execution on the mobile device,
      the fingerprint login preference setting allowing the user to access content associated with mobile device application after unlocking the mobile device with a fingerprint input;
   providing, by the mobile device, for presentation, and based on receiving a selection of the fingerprint login preference setting, a prompt for input of text-based credentials for authenticating the user for access to the mobile device application;
   sending, by the mobile device, the text-based credentials to an authentication server for authentication;
   receiving, by the mobile device and based on sending the text-based credentials, an authentication result indicating that the user is allowed to access the mobile device application,
      the authentication result including an authentication key;
   storing, by the mobile device, the authentication key in a memory of the mobile device;
   providing, by the mobile device and for presentation, a second menu that includes the mobile device application for execution on the mobile device;
   locking, by the mobile device and based on receiving an input selecting the mobile device application, the mobile device application,
      the locking the mobile device application preventing the user of the mobile device from accessing any content associated with the mobile device application;

providing, by the mobile device and for presentation, a prompt for the user to unlock the mobile device application using the fingerprint input;

retrieving, by the mobile device and using the fingerprint input, the authentication key from the memory of the mobile device and an identifier of the mobile device from the memory;

sending, by the mobile device, the authentication key and the identifier to the authentication server;

receiving, by the mobile device and from the authentication server, an indication that the authentication key matches an authentication key computed using the identifier; and unlocking, by the mobile device and based on receiving the indication, the mobile device application,
the unlocking of the mobile device application allowing the user to access content associated with the mobile device application.

2. The method of claim 1, further comprising:
providing, for presentation and based on receiving the indication, a user interface that facilitates user access to data associated with the mobile device application.

3. The method of claim 1, further comprising:
confirming, prior to locking the mobile device application, that a login preference setting for authenticating the user by the mobile device application includes the biometric login preference setting; and
transmitting, based on confirming that the login preference setting includes the biometric login preference setting and to an operating system of the mobile device, a request to lock the mobile device.

4. The method of claim 1, further comprising:
receiving a signal, from an operating system of the mobile device, indicating that the received biometric input is associated with the authorized user of the mobile device.

5. The method of claim 3, where the text-based credentials include characters that identify the user, and the method further comprises:
sending, based on receiving the authentication result, a request to the mobile device operating system to place the mobile device into a locked state;
generating, based on sending the request to place the mobile device into the locked state, a fingerprint unlock screen,
the fingerprint unlock screen being an input screen provided to unlock the mobile device using the fingerprint input;
receiving, based on receiving the fingerprint input to the fingerprint unlock screen, an indication of a successful fingerprint verification of the fingerprint input,
the user being registered to access the mobile device application based on the successful fingerprint verification;
retrieving the identifier from the memory;
sending the identifier to the authentication server;
receiving, from the authentication server and based on sending the identifier, a hash key generated from the identifier;
storing the hash key in the memory; and
setting the biometric login preference setting for authenticating the user by the mobile device application as the fingerprint login preference setting.

6. The method of claim 5, where
the biometric login preference setting is a setting to configure the mobile device to require a fingerprint recognition of the fingerprint input, and
the method further includes:
setting, based on the successful fingerprint verification, the fingerprint login preference setting as a user login preference for the mobile device application.

7. The method of claim 5, further comprising:
unlocking, based on the successful fingerprint verification, the mobile device.

8. A mobile device comprising:
a memory to store instructions; and
a processor to execute the instructions to:
provide, for presentation, a prompt for a user to unlock the mobile device using a fingerprint input,
the mobile device being in a locked state prior to providing the prompt;
verify a received fingerprint input as a fingerprint associated with an authorized user of the mobile device;
unlock the mobile device based on verifying the received fingerprint input;
provide a first menu including a prompt for the user to select a fingerprint login preference setting as a biometric login preference setting for logging into a mobile device application for execution on the mobile device,
the fingerprint login preference setting allowing the user to access content associated with mobile device application after unlocking the mobile device with a fingerprint input;
provide, for presentation and based on receiving a selection of the fingerprint login preference setting, a prompt for input of text-based credentials for authenticating the user for access to the mobile device application;
send the text-based credentials to an authentication server for authentication;
receive, based on sending the text-based credentials, an authentication result indicating that the user is allowed to access the mobile device application,
the authentication result including an authentication key;
store the authentication key in a memory of the mobile device;
provide, for presentation, a second menu that includes the mobile device application for execution on the mobile device;
lock the mobile device application based on receiving an input selecting the mobile device application,
the locking the mobile device application preventing the user of the mobile device from accessing any content associated with the mobile device application;
provide, for presentation, a prompt for the user to unlock the mobile device application using the fingerprint input;
retrieve, using the fingerprint input, the authentication key and an identifier of the mobile device from the memory;
send the authentication key and the identifier to the authentication server;
receive, from the authentication server, an indication that the authentication key matches an authentication key computed by the authentication server; and
unlock, based on receiving the indication, the mobile device application,
the unlocking of the mobile device application allowing the user to access content associated with the mobile device application.

9. The mobile device of claim 8, where the processor is further to:
confirm, prior to locking the mobile device application, that a login preference setting for authenticating the user by the mobile device application includes the fingerprint login preference setting; and
transmit, based on confirming that the login preference setting includes the fingerprint login preference setting and to an operating system of the mobile device, a request to lock the mobile device.

10. The mobile device of claim 9, where the text-based credentials include characters that identify the user, and where the processor is further to:
send, based on receiving the authentication result, a request to place the mobile device in a locked state;
generate, based on sending the request to place the mobile device into the locked state, a fingerprint unlock screen,
the fingerprint unlock screen being an input screen provided to unlock the mobile device using the fingerprint input;
receive, based on receiving the fingerprint input to the fingerprint unlock screen, an indication of a successful fingerprint verification of the fingerprint input,
the user being registered to access the mobile device application based on the successful fingerprint verification;
retrieve the identifier from the memory;
send the identifier to the authentication server;
receive, based on sending the identifier, a hash key generated from the identifier; and
store the hash key in the memory.

11. The mobile device of claim 10, where the processor is further to:
unlock, based on the successful fingerprint verification, the mobile device.

12. The mobile device of claim 8, where the processor is further to:
provide, for presentation and based on receiving the indication, a user interface that facilitates user access to data associated with the mobile device application.

13. The mobile device of claim 8, where the processor is further to:
allow, based on receiving the indication, the user to access any content associated with the mobile device application.

14. The mobile device of claim 10, where the processor is further to:
set, based on the successful fingerprint verification, the fingerprint login preference setting as a user login preference for the mobile device application.

15. A non-transitory computer-readable medium storing instructions, the instructions comprising:
one or more instructions which, when executed by a processor of a mobile device, cause the processor to:
provide, for presentation, a prompt for a user to unlock the mobile device using a fingerprint input,
the mobile device being in a locked state prior to providing the prompt;
verify a received fingerprint input as a fingerprint associated with an authorized user of the mobile device;
unlock the mobile device based on verifying the received fingerprint input;
provide a first menu including a prompt for the user to select a fingerprint login preference setting as a biometric login preference setting for logging into a mobile device application for execution on the mobile device,
the fingerprint login preference setting allowing the user to access content associated with mobile device application after unlocking the mobile device with a fingerprint input;
provide, for presentation and based on receiving a selection of the fingerprint login preference setting, a prompt for input of text-based credentials for authenticating the user for access to the mobile device application;
send the text-based credentials to an authentication server for authentication;
receive, based on sending the text-based credentials, an authentication result indicating that the user is allowed to access the mobile device application,
the authentication result including an authentication key;
store the authentication key in a memory of the mobile device;
provide, for presentation, a second menu that includes the mobile device application for execution on the mobile device;
lock the mobile device application based on receiving an input selecting the mobile device application,
the locking the mobile device application preventing a user of the mobile device from accessing any content associated with the mobile device application;
provide, for presentation, a prompt for the user to unlock the mobile device application using the fingerprint input;
retrieve, using the fingerprint input, the authentication key from the memory of the mobile device and an identifier of the mobile device from the memory;
send the authentication key and the identifier to the authentication server;
receive, from the authentication server, an indication that the authentication key matches an authentication key computed by the authentication server; and
unlock, based on receiving the indication, the mobile device application,
the unlocking of the mobile device application allowing the user to access content associated with the mobile device application.

16. The medium of claim 15, where the instructions further include:
one or more instructions which, when executed by the processor, cause the processor to:
confirm, prior to locking the mobile device application, that a login preference setting for authenticating the user by the mobile device application includes the fingerprint login preference setting; and
transmit, based on confirming that the login preference setting includes the fingerprint login preference setting and to an operating system of the mobile device, a request to lock the mobile device.

17. The medium of claim 16, where the text-based credentials include characters that identify the user, and where the instructions further include:
one or more instructions which, when executed by the processor, cause the processor to:
generate, based on receiving the authentication result, a signal that causes a fingerprint unlock screen of the mobile device to be provided, the fingerprint unlock screen being an input screen provided to unlock the mobile device using the fingerprint input;
receive, based on receiving the fingerprint input to the fingerprint unlock screen, an indication of a successful fingerprint verification of the fingerprint input,
the user being registered to access the mobile device application based on the successful fingerprint verification;
retrieve the identifier from the memory;
send the identifier to the authentication server;
receive, based on sending the identifier, a hash key generated from the identifier; and
store the hash key in the memory.

18. The medium of claim 15, where the instructions further include:
one or more instructions which, when executed by the processor, cause the processor to:
provide, for presentation based on receiving the indication, a user interface that facilitates user access to data associated with the mobile device application.

19. The medium of claim 15, where the instructions further include:
one or more instructions which, when executed by the processor, cause the processor to:
allow, based on receiving the indication, the user to access any content associated with the mobile device application.

20. The medium of claim 15, where the instructions further include:
one or more instructions which, when executed by the processor, cause the processor to:
set, based on verifying the received fingerprint input, the fingerprint login preference setting as a user login preference for the mobile device application.

* * * * *